United States Patent
Cocchi et al.

(10) Patent No.: US 10,588,330 B2
(45) Date of Patent: *Mar. 17, 2020

(54) MACHINE AND METHOD FOR MAKING LIQUID AND SEMI-LIQUID PRODUCTS OF THE ICE CREAM, PASTRY OR CATERING TRADE

(71) Applicant: ALI GROUP S.r.l.—CARPIGIANI, Cernusco sul Naviglio (IT)

(72) Inventors: Andrea Cocchi, Calderara di Reno (IT); Roberto Lazzarini, Reggio Emilia (IT)

(73) Assignee: ALI GROUP S.R.L.—CARPIGIANI, Cernuscosul (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/647,830

(22) Filed: Jul. 12, 2017

(65) Prior Publication Data

US 2018/0014552 A1    Jan. 18, 2018

(30) Foreign Application Priority Data

Jul. 15, 2016   (IT) .................. 102016000074471

(51) Int. Cl.
*A23G 9/20*   (2006.01)
*A23G 9/28*   (2006.01)
(Continued)

(52) U.S. Cl.
CPC .............. *A23G 9/20* (2013.01); *A23G 9/045* (2013.01); *A23G 9/08* (2013.01); *A23G 9/12* (2013.01);
(Continued)

(58) Field of Classification Search
CPC . A23G 9/14–9/166; A23G 9/28–9/288; A23G 9/46; A23G 9/08–9/12;
(Continued)

(56) References Cited

U.S. PATENT DOCUMENTS 3,158,485 A   11/1964   De Santa Luce
3,327,615 A    6/1967   Swan et al.
(Continued)

FOREIGN PATENT DOCUMENTS

CN   1289549 C   4/2001
CN   1813558 A   8/2006
(Continued)

OTHER PUBLICATIONS

Italian Search Report dated Apr. 20, 2017 from counterpart Italian App No. IT 201600074471.
(Continued)

*Primary Examiner* — Drew E Becker
(74) *Attorney, Agent, or Firm* — Shuttleworth & Ingersoll, PLC; Timothy J. Klima

(57) ABSTRACT

A machine for making liquid and/or semi-liquid products for the ice cream, pastry or catering trade, including:
  a processing container forming a processing chamber for making an ice cream product;
  a stirrer mounted inside the processing chamber;
  a thermal treatment system provided with at least one heat exchanger associated with the processing container, for exchanging heat with the container;
  a feed unit including a container containing a basic preparation for an ice cream, pastry or catering product, and a pressurized gaseous fluid injection device configured to inject the gaseous fluid into the container in such a way as to cause the basic preparation to be expelled from the container and transferred to the processing container;
  a diluting liquid injection device for delivering a diluting liquid.

19 Claims, 11 Drawing Sheets

(51) Int. Cl.

| | | |
|---|---|---|
| *A23G 9/22* | (2006.01) | |
| *A23G 9/08* | (2006.01) | |
| *B65D 83/00* | (2006.01) | |
| *B65D 85/78* | (2006.01) | |
| *A23G 9/04* | (2006.01) | |
| *A23G 9/12* | (2006.01) | |
| *A23G 9/14* | (2006.01) | |
| *A23G 9/16* | (2006.01) | |

(52) U.S. Cl.
CPC .............. *A23G 9/14* (2013.01); *A23G 9/166* (2013.01); *A23G 9/22* (2013.01); *A23G 9/28* (2013.01); *A23G 9/281* (2013.01); *B65D 83/0055* (2013.01); *B65D 85/78* (2013.01)

(58) Field of Classification Search
CPC . A23G 9/22; A23G 9/045; A23G 9/20; A23G 2220/02; B65D 83/0055–83/0077; B65D 83/06; B65D 83/14; B65D 83/60; B65D 83/66–83/687; B65D 85/78
USPC .......................................... 426/115, 524, 477
See application file for complete search history.

(56) References Cited

U.S. PATENT DOCUMENTS

| | | | | |
|---|---|---|---|---|
| 3,474,821 | A * | 10/1969 | Fuller | A23G 9/045 |
| | | | | 137/390 |
| 3,492,126 | A | 1/1970 | Rubenstein et al. | |
| 3,517,524 | A * | 6/1970 | Fiedler | A23G 9/045 |
| | | | | 222/129.1 |
| 3,803,870 | A * | 4/1974 | Conz | A23G 9/16 |
| | | | | 141/104 |
| 3,969,531 | A | 7/1976 | Cornelius | |
| 4,169,359 | A | 10/1979 | Weerstra | |
| 4,201,558 | A * | 5/1980 | Schwitters | A23G 9/045 |
| | | | | 137/594 |
| 4,659,575 | A * | 4/1987 | Fiedler | A23G 9/20 |
| | | | | 261/121.1 |
| 5,235,902 | A | 8/1993 | Ogawa et al. | |
| 5,269,146 | A | 12/1993 | Kerner | |
| 5,312,020 | A | 5/1994 | Frei | |
| 5,713,214 | A | 2/1998 | Ugolini | |
| 5,724,883 | A | 3/1998 | Usherovich | |
| 5,967,226 | A | 10/1999 | Choi | |
| 6,058,721 | A | 5/2000 | Midden et al. | |
| 6,182,862 | B1 | 2/2001 | McGill | |
| 6,438,987 | B1 | 8/2002 | Pahl | |
| 8,651,011 | B2 | 2/2014 | Sinzig | |
| 9,968,113 | B2 * | 5/2018 | Lazzarini | A23G 9/227 |
| 10,172,373 | B2 | 1/2019 | Cocchi | |
| 2001/0028913 | A1 | 10/2001 | Kolar et al. | |
| 2002/0043071 | A1 | 4/2002 | Frank et al. | |
| 2002/0048626 | A1 | 4/2002 | Miller et al. | |
| 2004/0003620 | A1 | 1/2004 | Cocchi et al. | |
| 2005/0103024 | A1 | 5/2005 | Rugeris | |
| 2005/0178793 | A1 | 8/2005 | Cheng et al. | |
| 2006/0169147 | A1 | 8/2006 | Cocchi et al. | |
| 2006/0201329 | A1 | 9/2006 | Lynch | |
| 2007/0051248 | A1 | 3/2007 | Lee et al. | |
| 2007/0110872 | A1 * | 5/2007 | Gerber | A23G 9/20 |
| | | | | 426/565 |
| 2009/0136639 | A1 | 5/2009 | Doglioni Majer | |
| 2009/0323462 | A1 | 12/2009 | Cocchi et al. | |
| 2010/0034950 | A1 | 2/2010 | Jones et al. | |
| 2010/0122539 | A1 * | 5/2010 | Cocchi | A23G 9/12 |
| | | | | 62/1 |
| 2010/0199846 | A1 | 8/2010 | Aus Der Fuenten et al. | |
| 2010/0229728 | A1 | 9/2010 | Kiefer et al. | |
| 2010/0242497 | A1 | 9/2010 | Bertone | |
| 2010/0263544 | A1 | 10/2010 | Kodden et al. | |
| 2010/0266740 | A1 | 10/2010 | Van Den Aker et al. | |
| 2011/0014339 | A1 | 1/2011 | Stahl et al. | |
| 2011/0045152 | A1 | 2/2011 | Stutz et al. | |
| 2011/0310695 | A1 | 12/2011 | Sus et al. | |
| 2012/0074176 | A1 * | 3/2012 | Sullivan | A61M 15/0028 |
| | | | | 222/541.2 |
| 2012/0199608 | A1 | 8/2012 | Cocchi et al. | |
| 2012/0217264 | A1 * | 8/2012 | Cocchi | A23G 9/04 |
| | | | | 222/95 |
| 2013/0000338 | A1 | 1/2013 | Cocchi et al. | |
| 2013/0152797 | A1 | 6/2013 | Mori | |
| 2013/0263747 | A1 | 10/2013 | Ugolini | |
| 2013/0287914 | A1 | 10/2013 | Fragniere | |
| 2014/0026761 | A1 * | 1/2014 | Bartoli | A47J 31/0668 |
| | | | | 99/295 |
| 2014/0134299 | A1 | 5/2014 | Guidorzi et al. | |
| 2014/0212559 | A1 | 7/2014 | Cocchi et al. | |
| 2014/0335232 | A1 | 11/2014 | Beth Halachmi | |
| 2014/0345652 | A1 | 11/2014 | Meng | |
| 2015/0141313 | A1 | 5/2015 | Aregger et al. | |
| 2015/0150412 | A1 | 6/2015 | Heitele | |
| 2015/0272382 | A1 * | 10/2015 | Truninger | A47J 31/56 |
| | | | | 99/286 |
| 2015/0289539 | A1 | 10/2015 | Moth et al. | |
| 2015/0320078 | A1 | 11/2015 | Cocchi | |
| 2015/0329282 | A1 * | 11/2015 | Bartoli | B65D 85/8043 |
| | | | | 426/115 |
| 2015/0329343 | A1 | 11/2015 | Kleinrchert | |
| 2016/0007626 | A1 | 1/2016 | Choi et al. | |
| 2016/0052706 | A1 * | 2/2016 | Talon | B65D 85/8043 |
| | | | | 426/115 |
| 2016/0214787 | A1 * | 7/2016 | Iotti | B65D 85/8043 |
| 2016/0242594 | A1 | 8/2016 | Empl et al. | |
| 2016/0249761 | A1 | 9/2016 | Llopis | |
| 2016/0302443 | A1 | 10/2016 | Lazzarini et al. | |
| 2016/0316781 | A1 * | 11/2016 | Zappoli | A23G 9/28 |
| 2017/0042181 | A1 | 2/2017 | Fiaschi | |
| 2017/0112165 | A1 * | 4/2017 | Cocchi | A23G 9/12 |
| 2017/0135520 | A1 | 5/2017 | Sato et al. | |
| 2017/0150844 | A1 | 6/2017 | Hesselbrock et al. | |
| 2017/0215456 | A1 * | 8/2017 | Noth | A23G 9/282 |
| 2017/0290354 | A1 | 10/2017 | Pabst et al. | |
| 2018/0098556 | A1 | 4/2018 | Cocchi et al. | |
| 2018/0303122 | A1 * | 10/2018 | Cocchi | A23G 9/20 |
| 2018/0305115 | A1 * | 10/2018 | Bartoli | B65D 85/8043 |

FOREIGN PATENT DOCUMENTS

| | | |
|---|---|---|
| CN | 101617733 A | 1/2010 |
| CN | 103228152 A | 7/2013 |
| CN | 103796562 A | 5/2014 |
| CN | 103857617 A | 6/2014 |
| EP | 0285709 A1 | 10/1988 |
| EP | 2401945 A1 | 1/2012 |
| EP | 2478803 A1 | 7/2012 |
| EP | 2491792 A1 | 8/2012 |
| EP | 3058831 A1 | 8/2016 |
| EP | 3081093 A1 | 10/2016 |
| EP | 3127431 A1 | 2/2017 |
| EP | 3158872 A1 | 4/2017 |
| GB | 1362752 A | 8/1974 |
| WO | 2011042489 A1 | 4/2011 |
| WO | 2012036635 A1 | 3/2012 |
| WO | 2012104760 A1 | 8/2012 |
| WO | 2012160532 A1 | 11/2012 |
| WO | WO2013019963 A2 | 2/2013 |
| WO | 2013041581 A1 | 3/2013 |
| WO | 2013188246 A2 | 12/2013 |
| WO | 2014029803 A1 | 2/2014 |
| WO | 2015022678 A1 | 2/2015 |
| WO | 2015056188 A1 | 4/2015 |
| WO | WO2015092637 A1 | 6/2015 |
| WO | 2015104610 A1 | 7/2015 |
| WO | 2015170174 A1 | 11/2015 |
| WO | 2016005112 A1 | 1/2016 |

(56) References Cited

OTHER PUBLICATIONS

Italian Search Report dated Sep. 14, 2015 for related Italian application No. BO20150179.
European Exam Report dated Sep. 26, 2017 from related European App No. 16164965.2.
Italian Search Report dated Apr. 20, 2016 for related Italian Application No. IT UB20155038.
Italian Search Report dated Apr. 19, 2016 from related Italian App No. U820154199.
Italian Search Report dated Oct. 24, 2017 from related Italian App No. 201700043975.
Italian Search Report dated Jun. 8, 2017 from related Italian App No. IT 201600100869.
Coffee Ice Cream NPL, https://noteatingoutinny.com/2007/04/14/fresh-coffee-premium-ice-cream/, p. 1-2. (Year: 2007).
European Search Report dated Nov. 7, 2017 for counterpart European Patent Application No. 17181161.5.
Cocchi—U.S. Appl. No. 15/947,397, filed Apr. 6, 2018.
Cocchi—U.S. Appl. No. 15/726,088, filed Oct. 5, 2017.
Cocchi—U.S. Appl. No. 15/285,876, filed Oct. 5, 2016.
Chinese Office Action dated Nov. 21, 2019 for related Chinese Patent Application No. 201611048851.9.

* cited by examiner

MACHINE AND METHOD FOR MAKING LIQUID AND SEMI-LIQUID PRODUCTS OF THE ICE CREAM, PASTRY OR CATERING TRADE

This application claims priority to Italian Patent Application 102016000074471 filed Jul. 15, 2016, the entirety of which is incorporated by reference herein.

BACKGROUND OF THE INVENTION

This invention relates to a machine and a method for making liquid and semi-liquid products of for ice cream (gelati, sorbets, soft ice cream, etc.), pastry (custard, chocolate, etc.) or catering (soups, etc.) trade.

As is known, a need which is strongly felt in this sector is that of being able to make ice cream type products in small portions very quickly and to a customer's individual request.

In effect, customers often demand to be able to have food products made on the spot to their specifications.

A need which is felt particularly strongly by machine manufacturers is that of having a machine capable of making liquid and semi-liquid products of the ice cream sector in very small quantities (single portions) and which is particularly simple and reliable.

Another particularly strongly felt need in the sector in question is the need for a machine which allows reducing the risks of product contamination, thus increasing food safety.

SUMMARY OF THE INVENTION

The aim of this invention is to provide a machine and a method for making products for the ice cream sector, in particular ice cream, pastries and catering products which allow satisfying the above mentioned need and, more specifically, a machine and a method which allow small quantities of ice cream, pastry or catering products to be made particularly easily based on the requirements expressed on the spot by the customer.

Another aim of the invention is to provide a machine and a method for making liquid and semi-liquid products for the ice cream, pastry or catering sector which allow reducing the risks of product contamination.

A further aim of the invention is to provide a machine and a method for making liquid and semi-liquid products for the ice cream, pastry and catering sector which constitute an effective alternative to the products of known type.

Yet another aim of the invention is to provide a machine and a method for making liquid and/or semi-liquid products for the ice cream, pastry or catering sector which allows the operation for producing liquid or semi-liquid products to be simplified and/or automated (partly or completely).

This aim is achieved by a machine and a method for making liquid and/or semi-liquid products for the ice cream, pastry and catering sector and comprising technical features disclosed herein.

These aims are achieved by a machine for making liquid and/or semi-liquid products for the ice cream, pastry or catering trade comprising:
- a processing container forming a processing chamber for making an ice cream product;
- a stirrer inserted inside the processing chamber;
- a thermal treatment system, provided with at least one heat exchanger associated with the processing container, for exchanging heat with the container;
- a feed unit comprising a container containing a basic preparation for an ice cream, pastry or catering product, and a pressurized gaseous fluid injection device configured to inject the gaseous fluid into the container in such a way as to cause the basic preparation to be expelled from the container and transferred to the processing container;
- a diluting liquid injection device for delivering a diluting liquid.

It should be noted that, according to the invention, the container of the feed unit may be a container of the disposable (single-use) type, such as, for example, a capsule, or a container of the refillable type (which will, therefore remain fixed in the machine, except for extraordinary maintenance operations).

BRIEF DESCRIPTION OF THE DRAWINGS

The technical features, with reference to the above aims, are clearly disclosed herein and the advantages are apparent from the detailed description which follows, with reference to the accompanying drawings which illustrate a preferred, non-limiting example embodiment, and in which.

DESCRIPTION OF THE PREFERRED EMBODIMENTS

Figure 1:
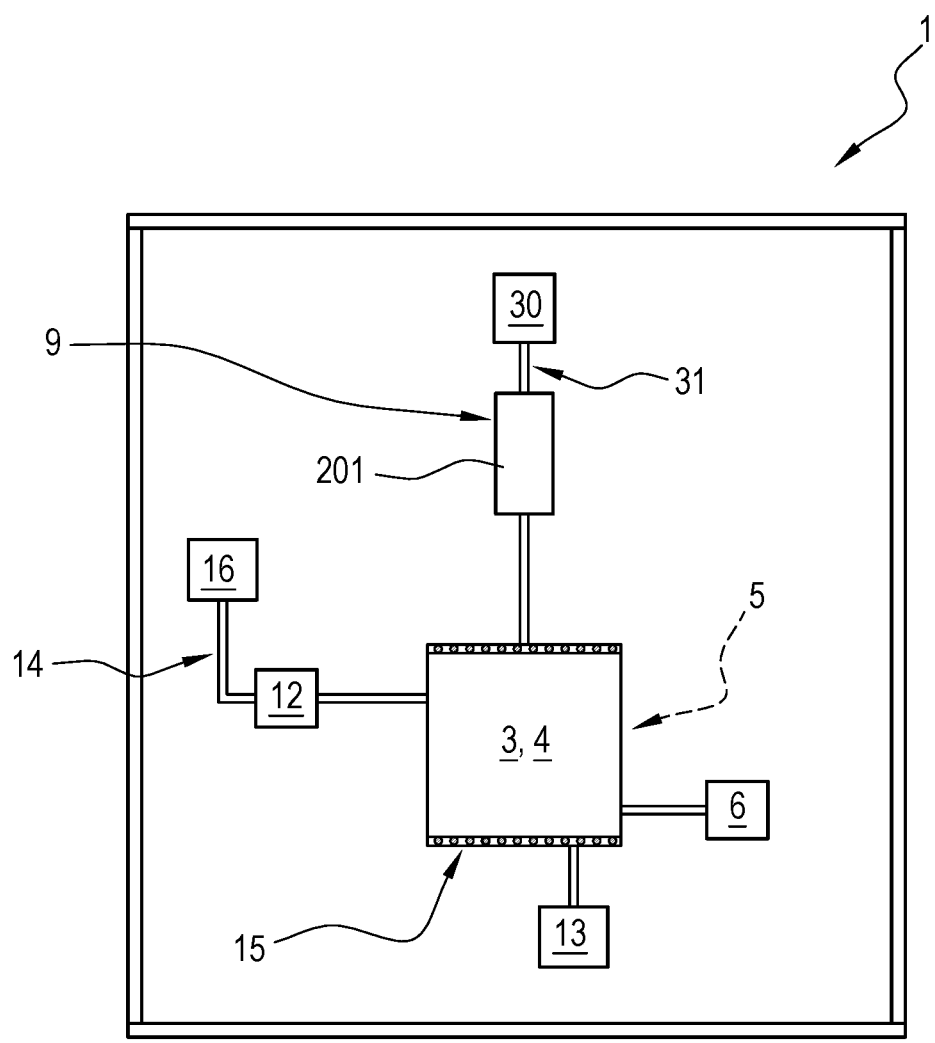
FIG. 1 is a schematic view of a first embodiment of a machine according to this invention.

With reference to the accompanying drawings, the numeral 1 denotes a machine for liquid and/or semi-liquid food products of the ice cream or pastries or catering sector.

It should be noted that the machine 1 is preferably designed to make ice cream or pastries or catering products.

Products of the ice cream, pastry or catering trade means products such as ice creams (cream, artisan, slush drinks, granitas etc.) or products such as custard, chocolate, or soups.

The products can be products of the hot type or products of the cold type.

Preferably, but not necessarily, the machine 1 is an ice cream machine, designed to make ice cream (preferably artisan gelato).

In the context of the invention, the term "ice cream" is used to mean a food preparation which is based on milk or milk-derived products and to which fruit, aromatics or other ingredients are added to obtain different flavours.

The machine 1 comprises:
- a processing container 3 defining a processing chamber 4;
- a stirrer 5 mounted inside the processing chamber 4 (not illustrated and schematically indicated in the accompanying drawings);

a thermal treatment system 13 (preferably for cooling), provided with at least one heat exchanger 15 associated with the processing container 3, for exchanging heat;

a feed device (or unit) 9 comprising a container 201 containing a basic preparation P (for making a product of the ice cream sector, in particular ice cream).

It should be noted that, preferably, the feed device (or unit) 9 comprises a pressurized gaseous fluid injection device 30 configured to inject the pressurized fluid into the container 201 in such a way as to cause the basic preparation P to be expelled from the container 201 and transferred to the processing container 3.

It should be noted that the feeding device 9 is positioned preferably above the container 3, that is, above the processing chamber 4.

As described in more detail below, the device for injecting a gaseous fluid injects a fluid F under pressure (for example air) in the container 201 in such a way as to allow the dispensing the food product P contained in the container 201.

The injection device 30 preferably comprises a source of pressurized fluid.

It should be noted that the expulsion of the basic preparation from the container 201 may also occur by gravity; the injection of air inside the container 201 assists the transfer of the basic preparation present inside the container 201.

It should be noted that the term 'pressurized fluid' means a fluid at a pressure greater than atmospheric pressure.

Preferably, the pressurized fluid is air.

Preferably, the injection device 30 comprises a conduit 31 for coupling (with the container 201) and a pressurized gaseous fluid generator (preferably a compressor), in fluid connection with the coupling conduit 31.

It should be noted that, preferably, the injection device 30 comprises a valve, designed to prevent or allow the flow of pressurized fluid towards the container 201 through the coupling pipe 31.

Advantageously, the pressurized fluid is released at a pressure (measured inside the container 201 with the container 201 closed and in differential relative to the atmospheric pressure) greater than 0.01 MPa. Still more preferably, the pressurized fluid is released at a pressure (measured inside the container 201 with the container 201 closed and in differential relative to the atmospheric pressure) greater than 0.02 MPa.

Furthermore, still more preferably, the pressurized fluid is released at a pressure (measured inside the container 201 with the container 201 closed and in differential relative to the atmospheric pressure) greater than 0.04 MPa.

Still more preferably, the pressurized fluid is released at a pressure (measured inside the container 201 with the container 201 closed and in differential relative to the atmospheric pressure) greater than 0.08 MPa.

Still more preferably, the pressurized fluid is released at a pressure (measured inside the container 201 with the container 201 closed and in differential relative to the atmospheric pressure) greater than 0.1 MPa.

Still more preferably, the pressurized fluid is released at a pressure (measured inside the container 201 with the container 201 closed and in differential relative to the atmospheric pressure) greater than 0.12 MPa. More preferably, the pressurized fluid is released at a pressure greater than 0.15 MPa; still more preferably at a pressure greater than 0.2 MPa.

It should be noted that FIG. 1 schematically illustrates an embodiment of the machine 1 in its most generic form.

According to another aspect, the machine 1 comprises a device 12 for injecting a dilution liquid (preferably but not necessarily associated with the processing container 3), for injecting the dilution liquid 12 and diluting the basic liquid (preferably the injection of dilution liquid occurs in the processing container 3).

According to another aspect, the device 12 for injecting a dilution liquid is configured to deliver water or a water-based mixture so as to allow diluting the basic preparation in the container with water or a water-based mixture.

Alternatively, the device 12 for injecting a dilution liquid is configured to deliver milk or a milk-based mixture so as to allow diluting the basic preparation in the container with milk or a milk-based mixture.

More generally speaking, the device 12 for injecting a dilution liquid is adapted to deliver a dilution liquid or a mixture of two or more different types of liquid.

Preferably, the injection device 12 also comprises a tank 16 for containing the dilution liquid.

In fact, as illustrated in FIG. 1, the machine 1 comprises a storage tank 16 for the basic liquid, and a connecting duct 14 connecting the storage tank 16 to the injection device 12.

The injection device 12 preferably further comprises a transfer pump (not illustrated) for transferring the dilution liquid from the tank 16 containing it to the point of delivery/dilution (where the dilution liquid is delivered and mixed with the basic preparation).

It should be noted that the device 12 for injecting a dilution liquid is advantageously and preferably associated with the processing chamber 4, that is, with the container 3.

More precisely, the device 12 for injecting a dilution liquid releases the dilution liquid into the container 3.

Further, according to another aspect, the device 12 for injecting a dilution liquid may comprise a duct connected to a water supply (not illustrated).

According to this aspect, the injection device 12 preferably comprises one or more valves which can be turned on or off to make or break the connection with the water supply.

According to this aspect, the dilution liquid is delivered (directly) into the processing chamber 4: thus, the injection device 12 is configured to deliver the dilution liquid into the processing chamber 4.

Preferably, the machine 1 also comprises serving means 6 (for serving the finished product), operating at the processing chamber 4 for delivering the (finished) product to the outside of the processing chamber 4.

With reference to the serving means 6 (for serving the finished product), it should be noted that these may be operated manually or automatically.

It should be noted that the stirrer 5 is adapted to be driven in rotation to allow mixing the basic product (transferred from the container into the processing chamber 4) with the dilution liquid inside the processing chamber 4.

Preferably, the machine 1 comprises an actuator (drive motor) to drive the stirrer 5 in rotation.

Preferably, the dimensions of the processing container 3 are such as to allow it to hold a portion of finished product (for example, ice cream) of between 50 g and 400 g, and more preferably, between 75 g and 200 g.

Preferably, the container 3 is cylindrical in shape.

Preferably, the container 3, cylindrical in shape, has a vertical axis.

Preferably, the container 3 is between 50 and 100 mm in diameter.

Still more preferably, the container 3 is between 80 and 250 mm in (axial) length.

Preferably, the container 3 is between 157,000 mm3 and 1,962,500 mm3 in volume.

It should be noted that the machine 1 is preferably adapted to process a single portion of product.

Preferably, the heat exchanger 15 is wound in a coil on the walls of the cylindrical container 3.

Preferably, the processing container 3 is provided with a door (at the bottom) for cleaning, and/or extracting the product from, the processing chamber 4.

The mixing and (simultaneous) thermal (cooling) treatment step is carried out inside the processing container 3 so as to convert the basic preparation, diluted with the dilution liquid, into the finished product (for example, an ice cream type product).

It should be noted that this step is extremely rapid (in the order of minutes).

More generally, it should be noted that during the stirring and (simultaneous) thermal treatment step, the basic preparation P (diluted with the dilution liquid) is preferably treated at a temperature between −15° C. and +130° C.

The control and drive unit 10, as described above, is thus configured to regulate the thermal treatment system (chiller) 13 in such a way as to enable the thermal treatment (e.g. cooling or heating) of the mixture being processed, inside the container 3, in a range between −15° C. and +130° C.

In the case of a cold product, for example a product such as ice cream, it should be noted that, preferably, during the stirring and simultaneous thermal treatment step, the basic preparation P (diluted with the dilution liquid) is thermally treated at a temperature between −15° C. and −2° C.

Thus, in this case, the thermal treatment means 13 (more precisely, cooling means) are preferably configured to cool the basic preparation P (diluted with the dilution liquid) inside the container 3 down to a temperature between −15° C. and −2° C. and, more preferably, between −13° C. and −3° C.

The control and drive unit 10, as described above with reference to a cold product, is thus configured to regulate the thermal treatment system (chiller) 13 in such a way as to enable the mixture being processed inside the container 3 to be cooled to a temperature in a range between −15° C. and −2° C. and, more preferably, between −13° C. and −3° C.

It should be noted that, preferably, the thermal treatment means 13 comprise, preferably, a compressor and a hydraulic circuit to which is connected the compressor, containing a heat carrier fluid.

Preferably, the thermal treatment means 13 comprise a refrigerating unit operating according to a thermodynamic vapour compression cycle.

Preferably, the refrigeration system comprises a compressor.

The heat exchanger 15 associated with the container 3 is configured to allow heat exchange between the heat exchanger fluid and the basic preparation P (diluted with the dilution liquid) inside the container 3.

It should be noted that preferably the heat exchanger 15 associated with the container 3, in cooling during normal use, acts as an evaporator.

Preferably, the thermal treatment means (system) 13 comprise a further exchanger (condenser), not illustrated.

Preferably, the thermal treatment means 13 are configured to operate according to a thermodynamic cycle, preferably a vapor compression cycle.

With reference to the container 201, it should be noted that the container 201 may contain one or more liquids, or one or more powders, or a granulate, or a gel, defining a basic preparation for the final product (preferably but not necessarily ice cream).

More generally speaking, it should be noted that the container 201 may be a removable container, preferably of the disposable type (such as, for example, a container of the capsule type 201C) or a refillable container that is reusable several times, for example of the fixed type.

Figure 7:
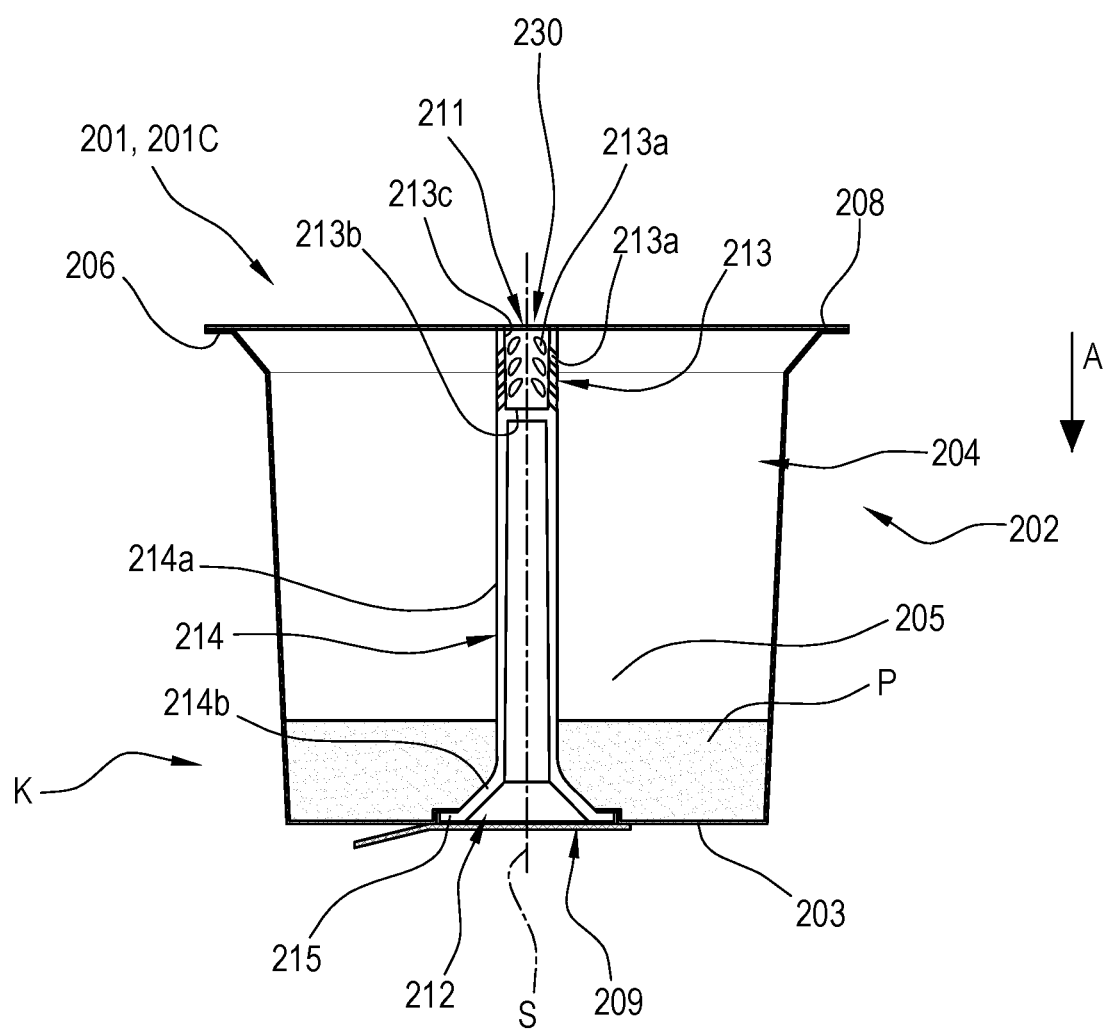
FIGS. 7 to 9 illustrate certain details of a container for filling the basic product of the capsule type, in different operating configurations, which can be used in each of machines of the preceding FIGS. 1 to 6.
Figure 8:
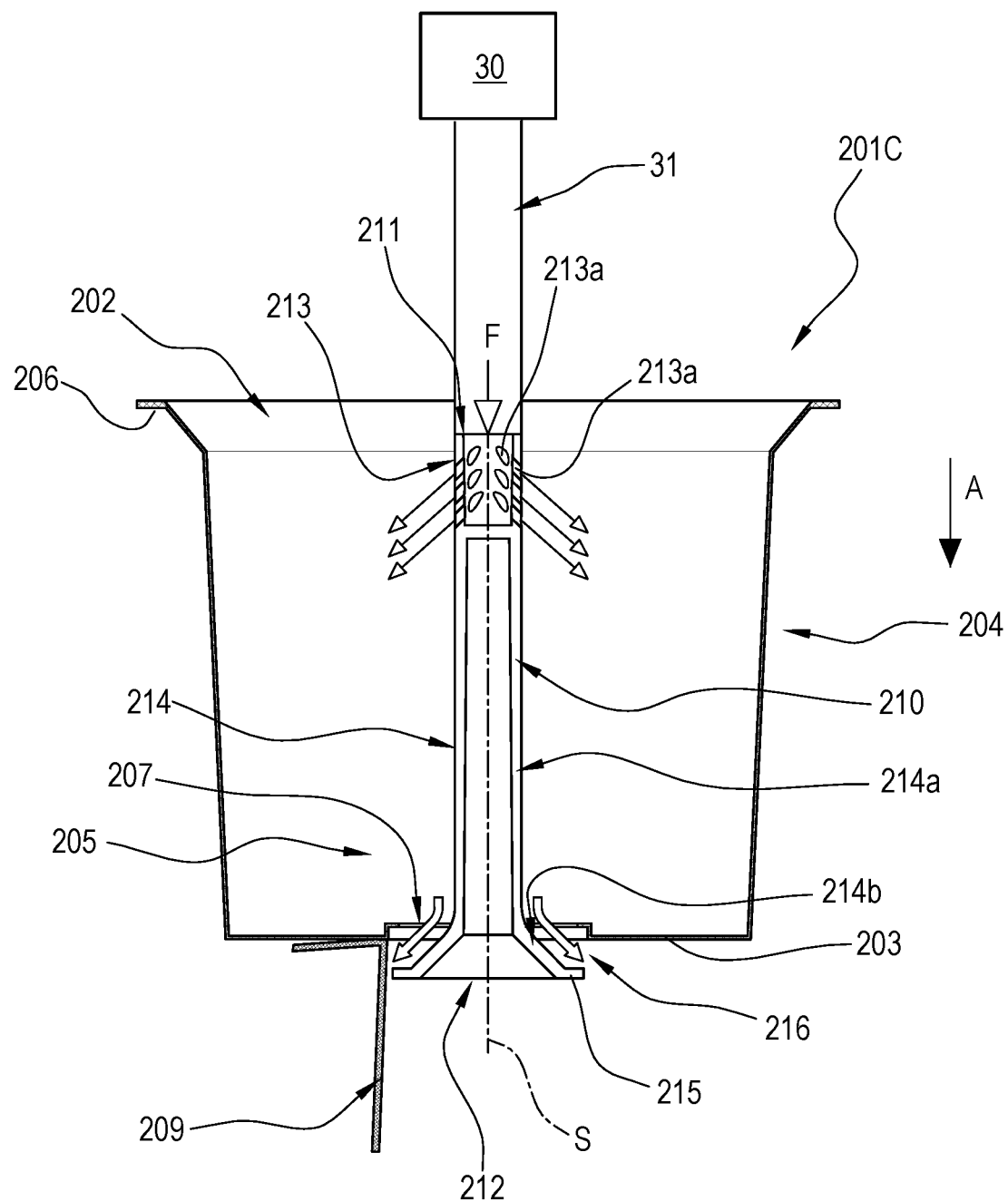
Figure 9:
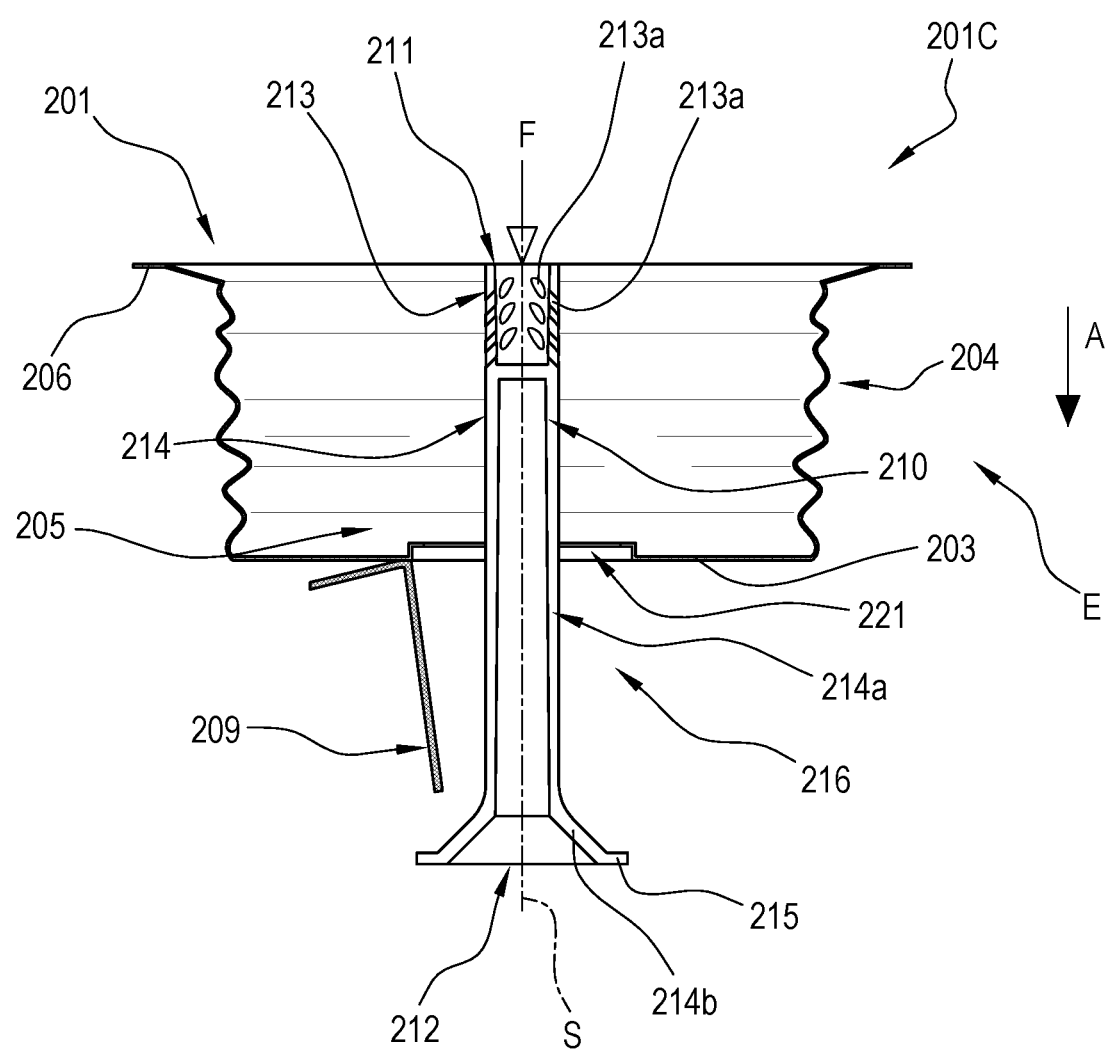
Figure 10:
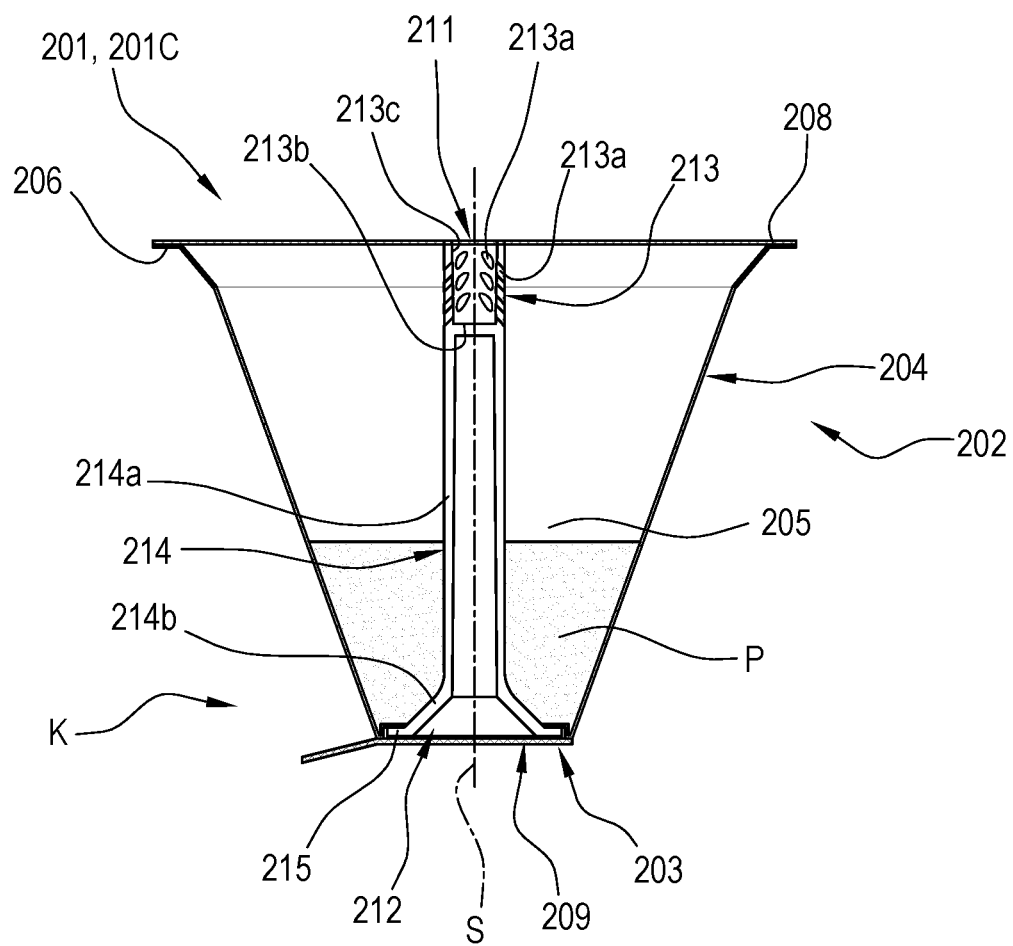
FIG. 10 illustrates a detail of a further variant (shape) of a container for filling the basic product which can be used in each of the machines of the preceding FIGS. 1 to 6.

It should be noted that FIGS. 7 to 9 illustrate a first embodiment of a container of the capsule type 201C whilst FIG. 10 illustrates a second embodiment of the container of the capsule type 201C (of a different shape to that of FIGS. 7 to 9).

It should be noted that the capsule 201C of FIG. 10 has side walls inclined (converging towards the bottom).

The capsule 201C comprises a case 202 which includes a base wall 203 and a side wall 204 defining a cavity 205 for containing the food preparation P and an edge 206 in the form of a flange extending from the side wall 204.

The capsule 201C comprises a nozzle 210, through which may be injected a pressurized fluid.

A nozzle 210, through which a pressurized fluid F (for example air) can be injected into the cavity 205, may be fixed to the cover element 208.

The nozzle 210 comprises a first, hollow portion 213, which is positioned to receive the means for injecting the fluid F, and comprises a plurality of openings 213a for feeding the fluid F from the injection means to the cavity 205.

The capsule 201C also comprises a covering element 208 fixed to the flanged edge 206 in order to hermetically seal the cavity 205 and a closing element 209 fixed in a partly detachable manner at least to the base wall 203 in order to hermetically seal the outlet opening 207.

It should be noted that, if the container 201 is of the refillable type, it is normally of non-deformable type, that is to say, designed to withstand the pressurizing pressure (normally between 0.15 and 0.4 MPa) without undergoing any deformation.

It should be noted that the walls of the container 201 enclose an internal space or cavity 205 containing one or more basic products defining the basic preparation P.

It should be noted that, in any case, the container 201 preferably comprises a device for closing/opening a portion of the wall (bottom).

Preferably, the closing device is a element 210 movable vertically.

The movable 210 element is normally located inside the container, more specifically in the inner cavity 205 for housing the basic product P.

It should be noted that the movement of the movable element 210 makes it possible to open or close a wall (bottom) of the container 210.

In this regard, the machine 1 is equipped with a movable actuator to allow the movement of the movable element 210 so as to open the container 201.

As described in more detail below, the movable element 210 may also act as an element for coupling with the fluid injection device 30, in particular with the conduit 31 of the device.

For this reason, in this regard, the movable element 210 is equipped with an inner cavity for distributing the fluid in the cavity 205 and a portion for coupling with the conduit 31 of the fluid injection device 30.

It should be noted that, advantageously, the machine 1 allows the production, starting from the dose contained in the container 201, of very small quantities of finished product (e.g. ice cream) in very short spaces of time (to the customer's specifications and taste).

A brief description is given below of the general operation of the machine illustrated in FIG. 1, with particular reference to the processing of a dose of finished product.

It should be noted that the container 201 present on the machine of FIG. 1 may be, as already mentioned, a single-use container of the capsule type 201C or a refillable container, which is full of the basic product for the purpose of subsequent processing and transformation into the finished product.

Starting from this condition, the device 30 for injection of fluid is put in fluid communication with the inner cavity 205 of the container 201.

It should be noted that the injection device 30, more specifically the conduit 31, may be permanently connected to the container 201 or coupled to it (by means of a movement of the conduit 31). It should be noted that, before activation, the injection device 30 should be in fluid communication with the inner cavity 205 of the container 201.

At this point, the injection device 30 is activated in such a way as to cause a pressurization of the container 201.

The pressurization of the container 201, to a pressure greater than that already indicated above (preferably greater than 0.15 MPa), determines and assists the expulsion of the basic product from the container 201 (which may also occur by the effect of gravity).

It should be noted that, preferably, at this point, the basic container 201 is opened at the bottom (under the effect of the pressure or, alternatively, by means of a mechanical movement one or more elements).

Preferably, in the above-mentioned step of opening the container 201, an actuator (movable element forming part of the machine 1) is operated which acts axially on the movable element 210 described above.

Preferably, the actuator is moved vertically, from the top downwards, to cause an opening of the container 210.

It should be noted that, in the case of the capsule 201C illustrated in FIGS. 7 to 10, the movable element 210 consist of the nozzle 210.

It should also be noted that, subsequently or simultaneously with the opening of the container 201, there is an injection of air under pressure for a predetermined time by means of the injection device 30; preferably for a time of between 1 and 60 seconds (more preferably for a time between of 2 and 30 seconds).

The basic product therefore escapes from the container 201 due to the effect of the flow of air (and also by gravity) determined by the injection device 30, in such a way as to be transferred into the container 3.

In this way, the container 210 is completely emptied inside the container 3, that is, the processing chamber 4.

The device 30 for injection of the air can then be activated for any injection of air for cleaning the container 201; in particular if the container 201 is of the refillable type, which can be reused several times.

At this point, the basic mixture in the container 3 is diluted with the dilution liquid and thermal treatment system 13 and the mixer 5 are activated to perform a mixing and thermal treatment of the product, so as to make the finished product.

It should be noted that, according to the machine 1, there may also be a mixing chamber (not illustrated) interposed between the container 201 and the container 3: the mixing of the basic product released from the container 201 with the dilution liquid may occur inside the mixing chamber before the introduction of the basic product mixed in the container 3.

With reference to a container 201 equipped with a movable element 210, in particular the capsule 201C described above which is equipped with the nozzle, attention is drawn to the following with regard to the expulsion of the basic product from the container 201.

The injection device 30 (that is to say, the device for injecting) is coupled to the first portion 213 of the nozzle 210 through a first end 211 of the nozzle 210.

Figure 4:
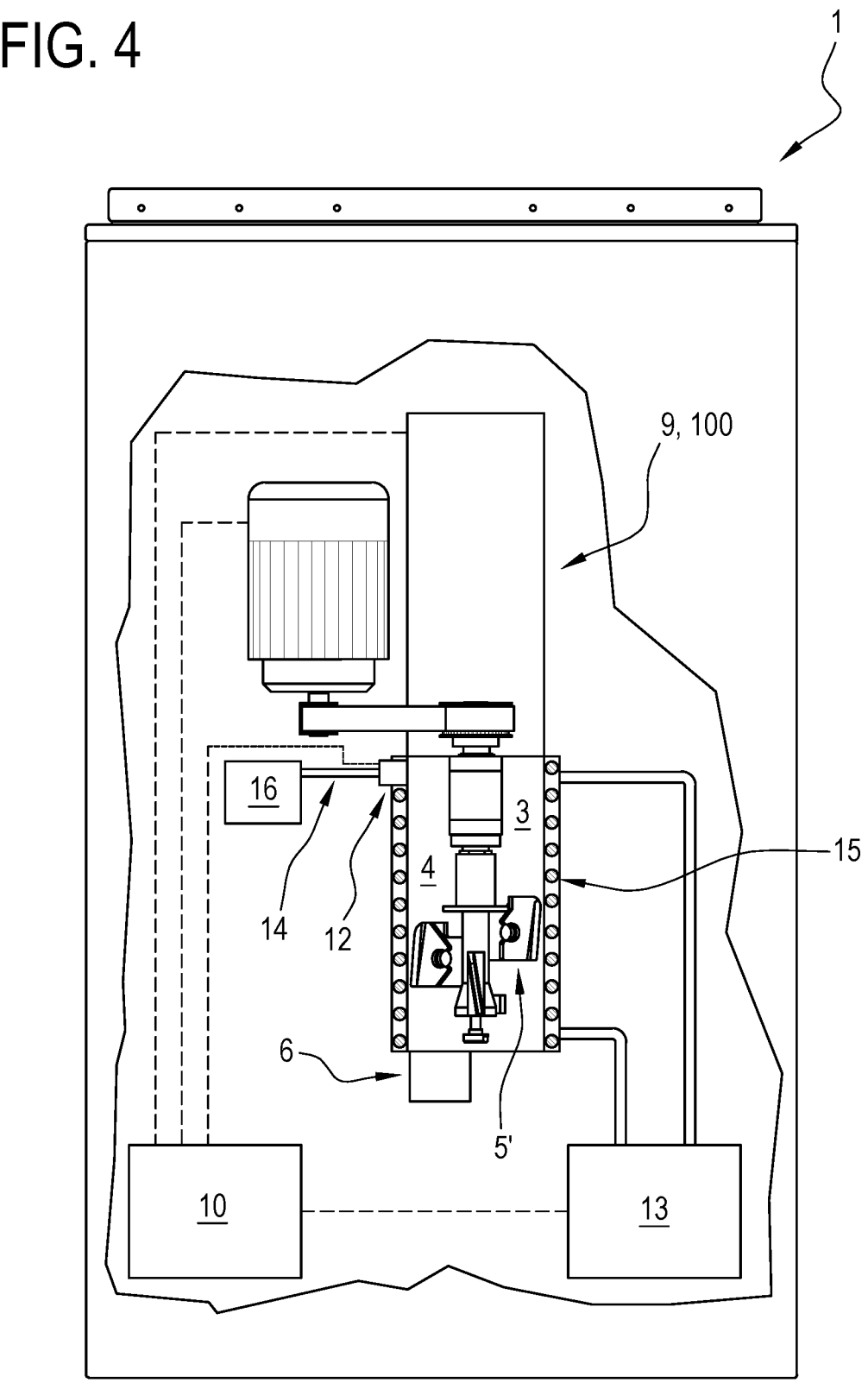
FIGS. 4 to 6 illustrate a schematic view of a third embodiment of a machine according to this invention.

The nozzle 210 may also comprise a second portion 214 which includes a second end 212, extends through the outlet opening 207 and comprises a first, tubular stretch 214a with constant cross section, and a second stretch 214b which is shaped relative to the first stretch 214a and terminates with an outer flange 215 which peripherally surrounds the second end 212 and closes the outlet opening 207 when the capsule 201C is in a first configuration K (this configuration is illustrated for example in FIG. 4).

The outer flange 215 of the nozzle 210 is configured to push the closing element 209 towards the outside to open the capsule 201C, when pressurized fluid is introduced in the capsule 201C.

The second stretch 214b of the nozzle 210 is configured to protrude beyond the base wall 203 of the capsule 201C when pressurized fluid is introduced in the capsule 201C (through the nozzle 210).

Further, preferably, the second stretch 214b of the nozzle 210 is divergent in shape in such a way as to guide the food preparation P outwards as it is squeezed out of the outlet opening 207 by the pressurized fluid F.

Figure 11:
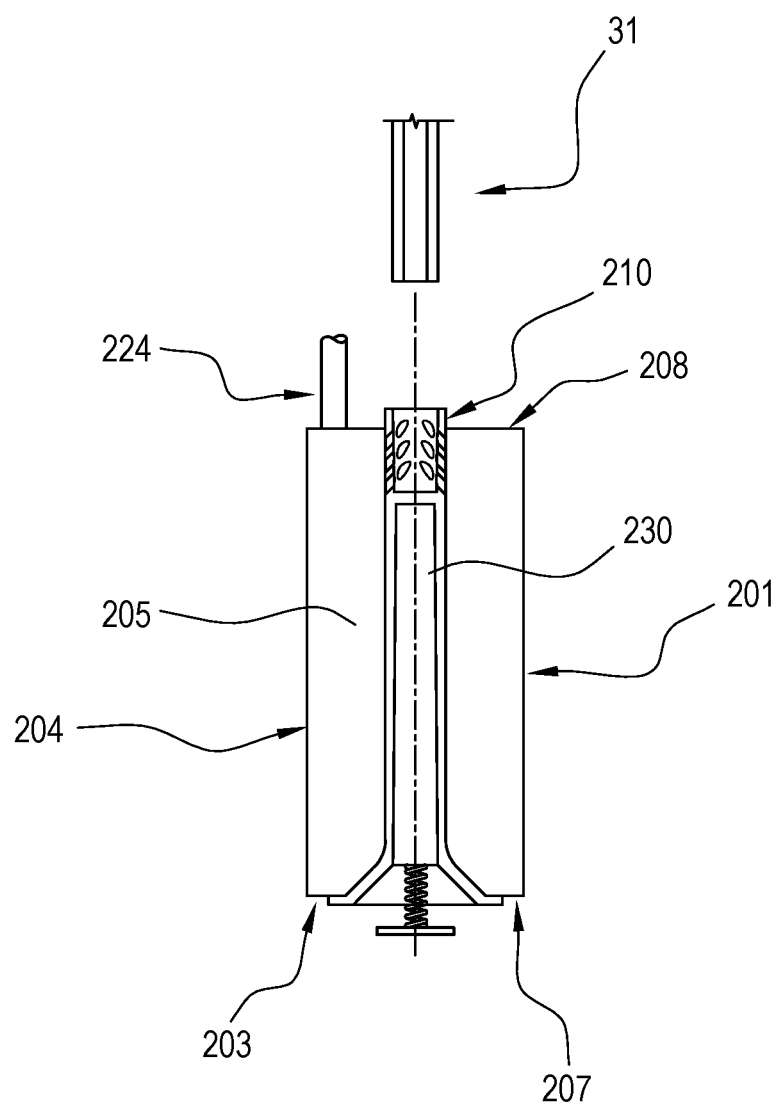
FIG. 11 illustrates a container for filling the basic product of the reusable type, which can be used in each of the machines of the preceding FIGS. 1 to 6.

FIG. 11 illustrate a container 201 of the reusable type which will be described in more detail below.

The container comprises the movable element 210 which makes it possible to open and close the opening 207 on the bottom of the container.

It should be noted that the movable element 210 is provided with an upper cavity, designed to couple with the conduit 31 of the injection device 30. The container 210 is also designed to be refilled, through the conduit labelled 224.

If the product P is a powder product, the fluid F is preferably compressed air which is mixed with the product P while the latter is transferred to the container 3 (chamber 4) in such a way as to facilitate the preparation of the finished product.

According to another aspect, the feed unit 9 comprises, optionally, a device for squeezing the capsule 201C, configured to allow the compression of the capsule 201C in such a way as to deform the side walls 204 of the capsule 201C.

The device for flattening capsule may comprise at least one element for contact with an upper wall 208 of the capsule 201C.

Preferably, the contact element is movable between a spaced-apart position relative to the capsule 201C and a contact and compression position of the upper wall 208 of the capsule.

It should be noted that the device for flattening the capsule 201C allows the capsule 201C to be flattened after transferring the basic product P contained therein inside the container 3.

The aim of the flattening device is essentially that of allowing the volume of the capsule 201C to be reduced after extraction of the basic product to allow the disposal.

With reference to the advantages of the invention, it should be stressed that the machine 1 avoids the need to handle the food product, thus substantially minimizing the risk of contamination.

Thus, a food product of particularly high quality can be guaranteed.

Further, the machine according to this invention can be cleaned in a particularly quick and easy manner (using a cleaning-in-place procedure).

Moreover, the machine 1 of the invention has a particularly reduced footprint, which means that shop floor space can be optimized.

The advantages of the machine 1 of the invention also include a reduced impact on the environment and reduced maintenance requirements.

According to another aspect relative to all the embodiments of the machine 1, the machine comprises a heater for heating the diluting liquid to a temperature of between 65° C. and 95° C. and the diluting liquid injection device 12 is configured to deliver a diluting liquid at a temperature of between 65° C. and 95° C.

Figure 2:
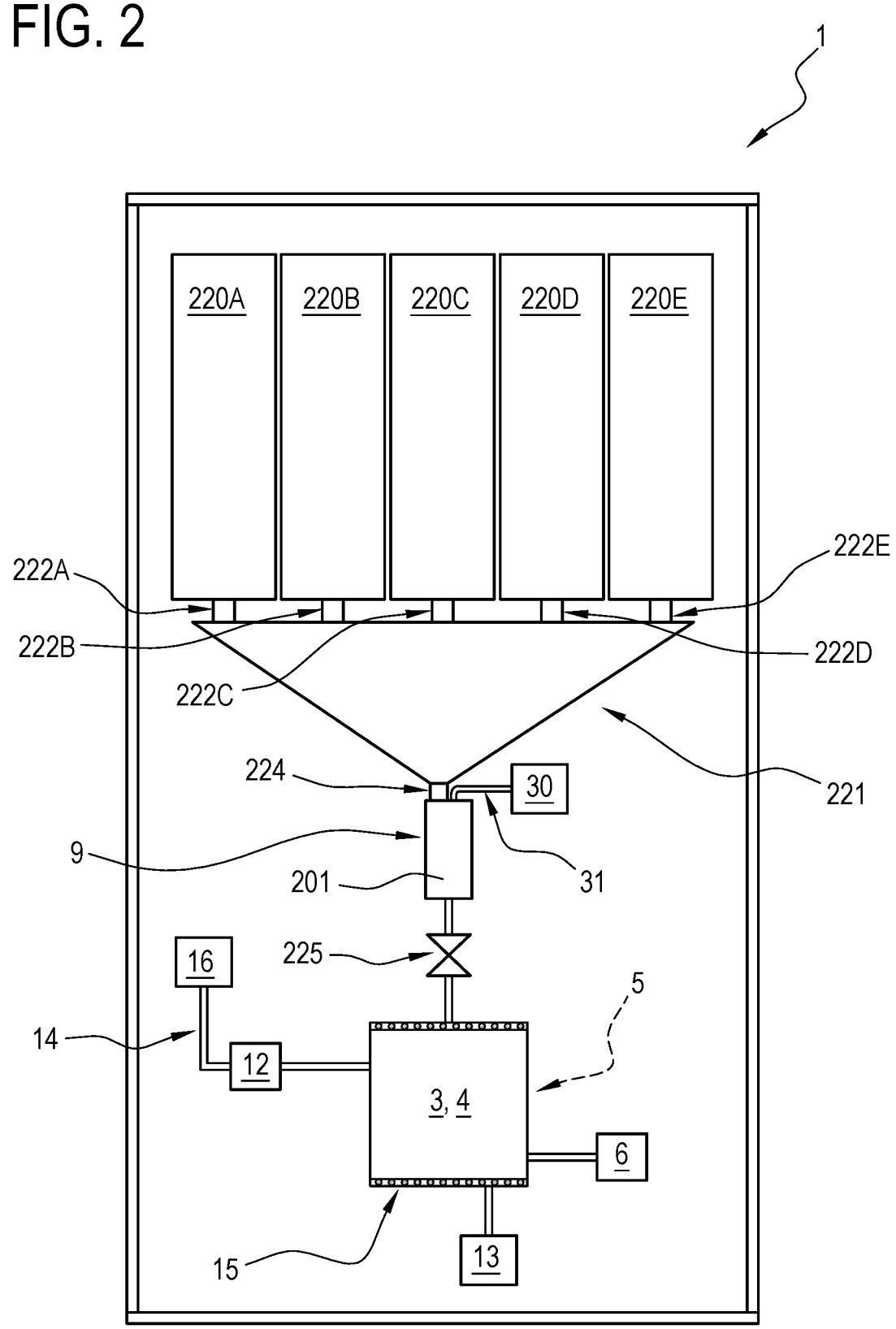
FIG. 2 is a schematic view of a second embodiment of a machine according to this invention.
Figure 3:
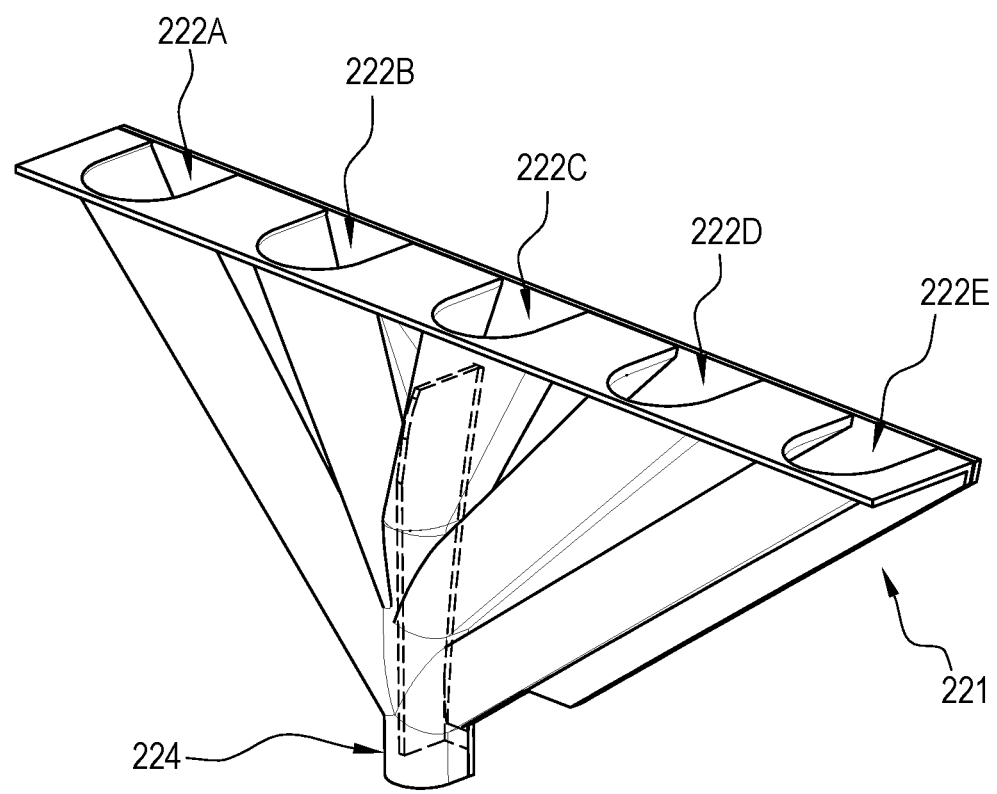
FIG. 3 schematically illustrates certain details of the machine of FIG. 2.
Figure 3:
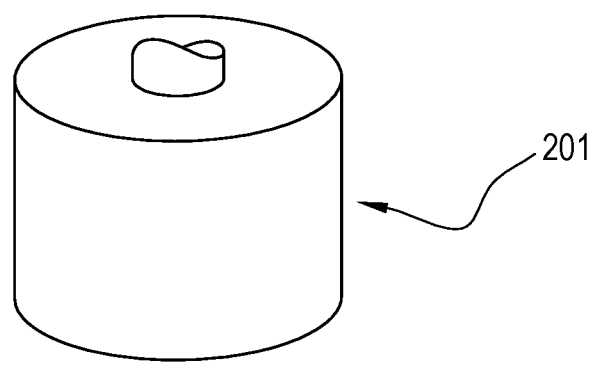

A description of a further embodiment of the machine 1, specifically illustrated in FIGS. 2 and 3, is given below with reference to a generic container 201 (the container 201 is a refillable container).

According to this embodiment, the feed unit 9 comprises a plurality of containers (220A, 220B, 220C, 220D, 220E) for containing the base products, positioned at the top of the container 201 and a conduit 221 for connecting the containers (220A, 220B, 220C, 220D, 220E) with the container 201.

It should be noted that the connecting duct 221 comprises a hopper having a plurality of inlet ducts 222A, 222B, 222C, 222D, 222E connected in use to the containers 220A, 220B, 220C, 220D, 220E and an outlet 224 connected in use to the container 201.

It should be noted that the hopper allows the container 201 to be filled.

The hopper is described in Italian patent application No. 102014902258468, in the name of the same Applicant, which is incorporated herein by reference as regards the technical features of the hopper, the feed containers, the mixing chamber and the processing chamber.

In use, the container 201 is filled with a combination of base material coming from one or more of the containers (220A, 220B, 220C, 220D, 220E) for containing basic products.

It should be noted that the container 201 is preferably a container of the refillable type; however, do not is exclude the possibility of using a capsule 201C as the container 201.

It should be noted that the machine may comprise a plurality of valves (not illustrated), each valve associated with one of the containers (220A, 220B, 220C, 220D, 220E) or to one of the inlet channels (222A, 222B, 222C, 222D, 222E) of the connecting conduit 221, to allow or prevent the release of the basic product from the respective container (220A, 220B, 220C, 220D, 220E).

The opening or closing of one of the valves determines the transfer of the basic product from a container (220A, 220B, 220C, 220D, 220E) to the container 201, through the connecting conduit 221.

According to another aspect, a valve 225 is interposed between the container 201 and the container 3, which is openable to allow feeding the basic products to the container 3.

The valve 225 may be integrally associated with the container 201 (as in the case of the nozzle 210 of the capsule 201C which defines the valve 225) or it may be outside the container 201.

Preferably, the valve 225 can be opened/closed by means of an actuator.

With reference to the expulsion of the basic product from the container 201 towards the processing chamber 4, reference is made to the description given above with regard to the machine 1 illustrated in FIG. 1.

Figure 5:
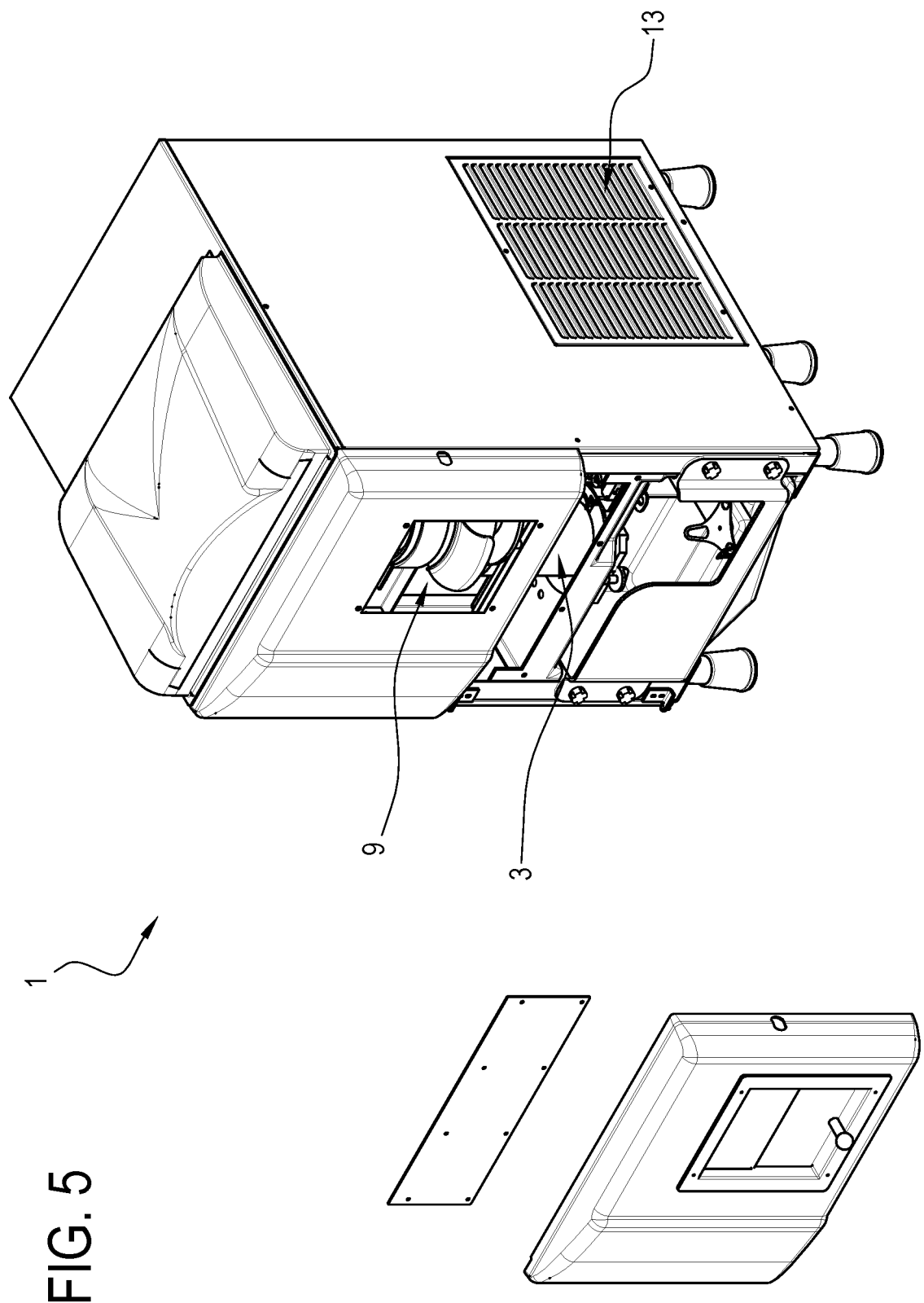
Figure 6:
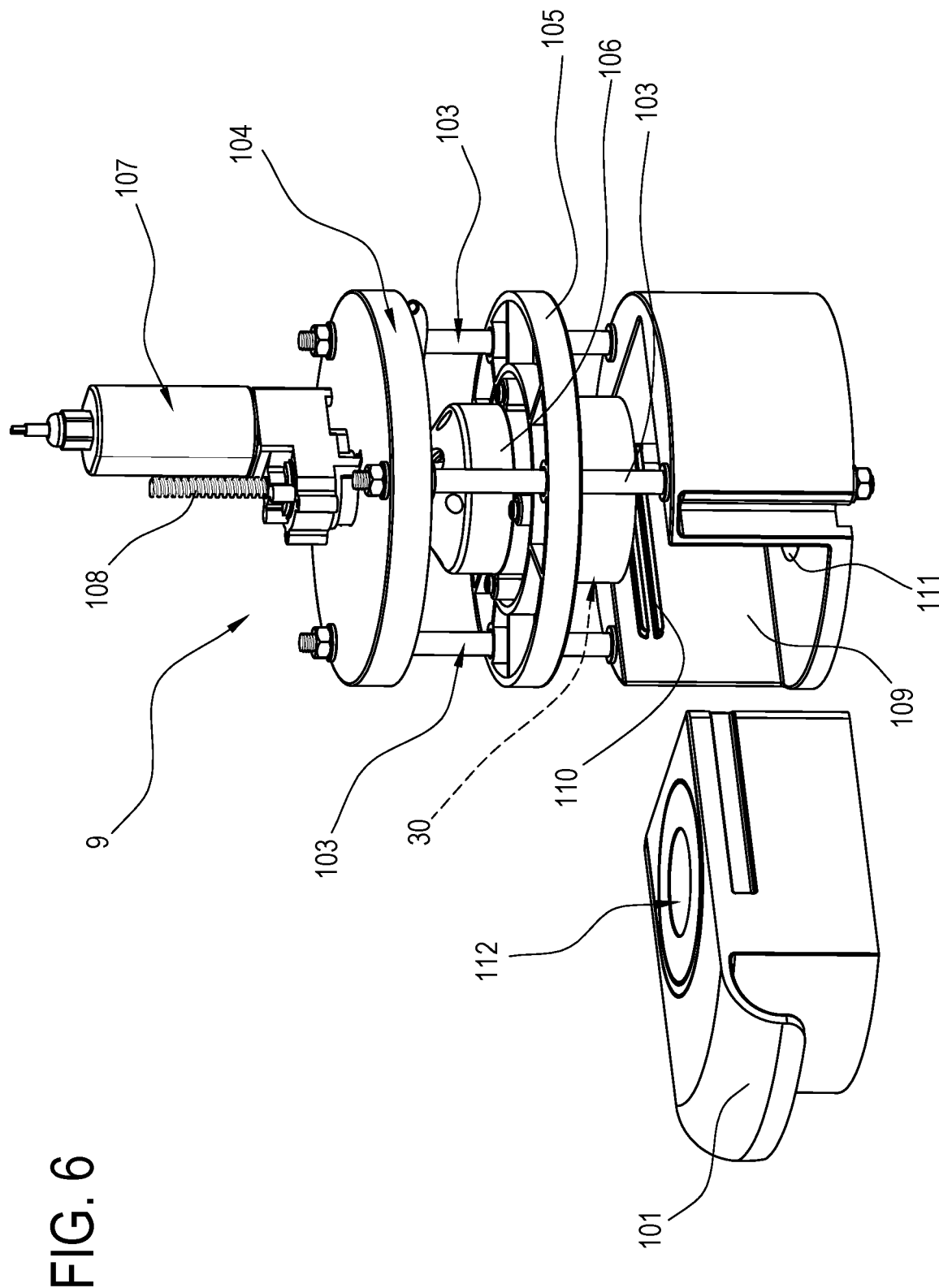

The operation of the machine illustrated in the accompanying FIGS. 4 to 6 will now be briefly described.

The machine 1 is particularly suitable to the production of finished product starting from a container 201 in the form of a capsule 201C.

The machine comprises a unit for loading the capsule 201C.

Preferably, the loading unit comprises a drawer 101.

The feed unit 9 comprises a seat 112 for filling the capsule 201C and a dispensing unit 106.

For dispensing the food product P contained in the capsule 201C and sending it to the container 3 (for example to the mixing and cooling device), the capsule 201C is inserted in the seat 112 of the drawer 101 and the drawer 101 is inserted in turn in a compartment 109 forming part of the machine 1.

After inserting the drawer 101 with the capsule 201C in the compartment 109, the actuator 107 is activated to move the dispensing unit 106 down until the injection device 30 perforates the covering element 208 and is received in the first portion 213 of the nozzle 210.

The dispensing unit 106 is fixed to a supporting element 105 slidably coupled to the columns 103.

The dispensing unit 106 is connected to a threaded shaft 108 which is driven by an actuator 107 to rotate and slide in a direction parallel to the columns 103, that is, in a vertical direction, in such a way as to move the dispensing unit 106 up or down along the columns 103 together with the supporting element 105.

In other words, according to a possible embodiment, the dispensing unit 106 is driven by a lead nut and screw mechanism or device.

Preferably, the dispensing unit 106 supports the device 30 for distributing a pressurized fluid (movably between the far position and the contact and compression position).

The injection device 30 is, at this point, activated by pressurizing the capsule 201C (preferably at a pressure greater than 0.15 MPa).

Preferably, subsequently, the nozzle 210 is moved, relative to the bottom wall of the capsule 201C, from the top downwards.

For this reason, during this step, the dispensing unit 106 (the entire unit or the elements of the unit 106 which support a conduit 31 for connection with the nozzle 210) is moved from the top downwards, so as to move vertically the nozzle 210 of the capsule 201C.

The capsule 201C is then to open at the opening 207.

It should be noted that, after the opening of the capsule 201C, the basic product is released towards the container 3.

It should be noted that, at this point, the injection of pressurized fluid determines and assists a further (complete) escape of the base product P (through the opening 207 of the capsule 201C).

It should be noted that the injection of pressurized fluid occurs for a preferred time interval of between 1 and 20 seconds; more preferably for a time interval of between 2 and 10 seconds.

It should be noted that the injection device 30 is coupled with the nozzle 210, so as to allow the flow of fluid under pressure directly inside the nozzle 210.

It should be noted that the device 30 for injection of pressurized fluid perforates, preferably, the upper wall of the capsule 201C for coupling with the nozzle 210 inside the capsule 201C.

It should be noted that the coupling conduit 31 is coupled with the nozzle 210 during injection of pressurized fluid in the capsule 201C.

It should be noted that the pressurized fluid escapes through the holes or openings 213a provided in the nozzle 210.

The nozzle 210 protrudes, preferably but not necessarily, from the base wall 203 by a limited amount and an annular opening 216 is formed between the base wall 203 and the second portion 214 of the nozzle 210 to let the food preparation P start coming out of the capsule 201C.

Alternatively, the nozzle 210 does not escape from capsule 201C and, below, a portion of the base wall is detached to form the above-mentioned opening 207.

It should be noted that the compression of the capsule 201C can be actuated in the machine 1 with the aim of allowing the reduction in volume of the capsule 201C for the purpose of subsequent disposal.

In this way, the volume of the case 202 is reduced, as shown in FIG. 9, since the capsule 201C passes to a final compression configuration E, wherein the capsule 201C has a minimum volume.

This aspect is optional.

The side wall 204, during the flattening, is compressed; in this way, the volume of the case 202 is reduced.

When dispensing of the product P is finished, the dispensing unit 106 moves back up to its starting position so that the drawer 101 can be extracted from the compartment 109 and the used capsule 201C can be removed by simply turning the drawer upside down.

Another aspect of the invention also defines a method for making a food product for the ice cream or catering sector in doses (preferably a method for making ice cream).

The method comprises the following steps:
preparing a processing container 3 and associating the processing container 3 with a stirrer 5 inserted inside the processing container 3 with possibility of rotation;
preparing a thermal treatment system 13 equipped with at least one heat exchanger 15 and associating the heat exchanger 15 with the processing container 3 to exchange heat with the container 3 such as to cool the processing container 3;
preparing a container 201 for containing a basic preparation P;
preparing an opening 207 on the container 201;
injecting a pressurized gaseous fluid into the cavity 205 of the container 201 to assist and allow the basic preparation P to flow out through the opening 207 and transfer the preparation P into the container 3 (by the thrust exerted by the gaseous fluid);
diluting the basic preparation P (with a diluting liquid);
mixing the basic preparation P and the diluting liquid by means of the stirrer 5, and simultaneously subjecting the basic preparation P and the dilution liquid to a thermal treatment.

Preferably, the step of simultaneously subjecting to thermal treatment the basic preparation P and the dilution liquid comprises the step of subjecting the basic preparation P and the dilution liquid during mixing to thermal treatment at a temperature of between −15° C. and +130° C.

According to one aspect, the step of simultaneously subjecting to thermal treatment the basic preparation P and the dilution liquid comprises the step of subjecting the basic preparation P and the dilution liquid during mixing to cooling at a temperature of between −15° C. and 0° C. (preferably for making a dose of product of the ice cream type or, more generally, a product of the cold type).

According to another aspect, the step of simultaneously subjecting to thermal treatment the basic preparation P and the dilution liquid comprises the step of subjecting the basic preparation P and the dilution liquid during mixing to heating at a temperature of between 40° C. and 130° C. (preferably for making a catering product or, more generally, a product of the hot type).

It should be noted that, according to another aspect, the dilution liquid may be introduced at a temperature of between 65° C. and 95° C.; in this way it is advantageously possible to sanitize the base preparation (that is to sanitize, and/or pasteurize and/or sterilize).

It should be noted that according to the description, the basic preparation P is transferred, together with the pressurized fluid and by means of the pressurized fluid itself, into the container 3, that is, into the processing chamber 4 (preferably directly, that is to say, without going by way of intermediate conduits).

Preferably, the pressurized fluid is a gas (and still more preferably, air).

It should be noted that, advantageously, the transfer of the basic preparation P (preferably in powder form) together with the pressurized fluid, and by means of the pressurized fluid itself, from the container 201 to the container 3 has considerable advantages in terms of machine cleaning, food safety and maintenance.

Moreover, the container can easily be emptied completely by means of the pressurized fluid, without leaving residues of the product P inside it (this is especially true if the basic product P is powder).

It should be noted that, preferably, according to another aspect of the description, the method comprises a step of deforming, by compression, the side walls 204 of the capsule 201C to cause a flattening of the capsule 201C.

Preferably, the step of deforming, by compression, the side walls 204 of the capsule 201C to cause a flattening of the capsule 201C is performed after the step of injecting a gaseous fluid under pressure inside the cavity 205 of the capsule 201C (preferably at the end).

Preferably, the feeding of the fluid F under pressure makes it possible to open the container 201, in particular allowing the opening 207 to be opened from which the basic preparation P comes out.

According to yet another aspect, the step of injecting a pressurized fluid into the cavity 205 of the container 201 comprises a step of injecting pressurized air into the cavity 205 of the capsule 201C.

According to yet another aspect, the step of preparing a capsule 201C comprises a step of making a bottom opening 207, in the base wall 203 and slidably inserting a nozzle 210 into the opening 207.

The nozzle 210 is provided with the first, upper hollow portion 213 communicating with the cavity 205 of the capsule through the plurality of openings 213a.

According to this aspect, the step of injecting a pressurized fluid into the cavity 205 of the capsule 201C comprises a step of injecting pressurized fluid into the cavity 205 of the capsule 210 through the holes or openings 213a.

It should be noted that, more generally speaking, the nozzle 210 is movable between a first position and second position.

According to another aspect, the step of preparing an opening 207 in the capsule 201C comprises a step of making an opening 207 in the capsule 201C in the base wall 203 of the capsule 201C.

According to another aspect, in particular if the container 201 is of the refillable type, after the step of transferring the preparation P into the container 3 there is a step of injecting cleaning air in the container 201.

It should be noted that according to the embodiment of the machine illustrated in FIGS. 7 and 8, the method comprises a step of filling the container 201, by gravity, with the basic product from the containers (220A, 220B, 220C, 220D, 220E).

Subsequently, preferably, the container 201 is closed, so as to keep the basic product inside it in thermal sealing conditions.

It should be noted that, at this point, the container 201 is opened at the bottom.

Preferably, in order to allow opening of the container 201, a contact element is moved along a predetermined direction (vertical).

If the container 201 is equipped with a closing element (as in the example illustrated in FIGS. 4 to 6), such as, for example, the nozzle 210, the contact element determines the movement of the nozzle 210, to allow the opening of the container 201.

Preferably, the step of injecting a pressurized fluid comprises injecting a pressurized fluid at a pressure greater than 0.15 Mpa.

What is claimed is:

1. A machine for making liquid and/or semi-liquid products for an ice cream, pastry or catering trade, comprising:
    a processing container forming a processing chamber for making a liquid and/or semi-liquid ice cream, pastry or catering product;
    a stirrer mounted inside the processing chamber;
    a thermal treatment system including a heat exchanger operatively connected to the processing container, for exchanging heat with the processing container;
    a feed unit comprising a feed container for containing a basic preparation for the ice cream, pastry or catering product, and a gaseous fluid injector suitable for injecting a pressurized gaseous fluid, at a pressure greater than 0.04 MPa, into the feed container in such a way as to cause the gaseous fluid to mix with the basic preparation and convey the mix of the gaseous fluid and the basic preparation from the feed container and into the processing container; wherein the feed container is between 157000 mm$^3$ and 1962500 mm$^3$ in volume;
    a pressurized gaseous fluid generator suitable for generating the pressurized gaseous fluid; and wherein the gaseous fluid injector includes a conduit coupling the pressurized gaseous fluid generator and the feed container;
    wherein the gaseous fluid injector comprises a first valve suitable for selectively allowing or preventing flow of the pressurized gaseous fluid into the feed container through the conduit;
    a second valve interposed between the feed container and the processing container and which is openable to allow feeding of the mix of the gaseous fluid and the basic preparation from the feed container and into the processing container;
    a diluting liquid injector connected to the processing container for delivering a diluting liquid into the processing container to create a mixture with the basic preparation;
    a control and drive unit operatively connected to the thermal treatment system to regulate the thermal treatment system to thermally treat the basic preparation and diluting liquid mixture in the processing container with the heat exchanger to a range between −15° C. and −2° C.

2. The machine according to claim 1, wherein the feed container includes a wall and an opening on the wall and houses a movable element movable between a closed position where the opening is closed and an open position where the opening is open.

3. The machine according to claim 2, and further comprising an actuator configured to abut against the movable element to cause the movable element to move between the closed and open positions.

4. The machine according to claim 2, wherein the movable element includes an internal cavity open at one end and leading out of the feed container to allow coupling to the gaseous fluid injector.

5. The machine according to claim 1, wherein the feed container is a fixed reusable container.

6. The machine according to claim 1, wherein the feed container is a disposable capsule.

7. The machine according to claim 6, wherein the feed unit further comprises a press for squeezing the capsule, configured to compress the capsule in such a way as to deform side walls of the capsule.

8. The machine according to claim 1, and further comprising a heater for heating the diluting liquid to a temperature of between 65° C. and 95° C. and wherein the diluting liquid injector is configured to deliver the diluting liquid at a temperature of between 65° C. and 95° C.

9. The machine according to claim 1, wherein the pressurized gaseous fluid is air.

10. The machine according to claim 1, wherein the pressurized gaseous fluid injector is configured to pressurize the feed container to a pressure greater than 0.6 MPa.

11. The machine according to claim 1, wherein the gaseous fluid injector comprises a distribution element for distributing the pressurized gaseous fluid, configured to establish a fluid connection with an internal cavity inside the feed container and mounted movably between a position of coupling to the feed container and a position of uncoupling from the feed container.

12. The machine according to claim 1, and further comprising a storage tank for storing the diluting liquid and a duct for connecting the storage tank to the diluting liquid injector.

13. The machine according to claim 1, wherein the feed unit further comprises a plurality of containment containers for containing basic products, mounted above the feed container and a duct for connecting the containment containers to the feed container.

14. The machine according to claim 13, wherein the connecting duct comprises a hopper having a plurality of inlet ducts connected in use to the containment containers and an outlet connected in use to the feed container.

15. A method for making a food product in portions, for an ice cream, pastry or catering trade, comprising the following steps:
    providing a processing container and a rotatable stirrer inserted inside the processing container;
    providing a thermal treatment system including a heat exchanger operatively connected to the processing container, for exchanging heat with the processing container;
    providing a feed container having an upper wall, side walls and a lower base wall, which define a cavity for containing a basic preparation;
    providing an opening on the feed container;
    providing that the feed container is between 157000 mm3 and 1962500 mm3 in volume;

injecting a pressurized gaseous fluid, at a pressure greater than 0.04 MPa, into the cavity of the feed container to mix the gaseous fluid with the basic preparation and convey the mix of the gaseous fluid and the basic preparation out from the feed container through the opening and into the processing container;

diluting the basic preparation with a diluting liquid to create a mixture of the basic preparation and the diluting liquid;

mixing the basic preparation and the diluting liquid with the stirrer, and simultaneously subjecting the basic preparation and the diluting liquid to a thermal treatment with the thermal treatment system to thermally treat the basic preparation and diluting liquid mixture in the processing container with the heat exchanger to a range between −15° C. and −2° C.;

providing:
   a pressurized gaseous fluid generator suitable for generating the pressurized gaseous fluid; and wherein the gaseous fluid injector includes a conduit coupling the pressurized gaseous fluid generator and the feed container;
   wherein the gaseous fluid injector comprises a first valve suitable for selectively allowing or preventing flow of the pressurized gaseous fluid into the feed container through the conduit;
   a second valve interposed between the feed container and the processing container and which is openable to allow feeding of the mix of the gaseous fluid and the basic preparation from the feed container and into the processing container.

16. The method according to claim 15, wherein the step of diluting the basic preparation comprises a step of heating the diluting liquid to a temperature between 65° C. and 95° C.

17. The method according claim 15, wherein the step of diluting the basic preparation comprises a step of feeding the diluting liquid into the processing container.

18. The method according to claim 15, and further comprising a step of deforming the side walls of the feed container by compression to squeeze the feed container and thereby reduce the volume of the feed container.

19. The method according to claim 15, wherein the step of injecting a pressurized gaseous fluid into the cavity of the feed container comprises a step of injecting pressurized air into the cavity of the feed container.

* * * * *